(12) United States Patent
Niemiec et al.

(10) Patent No.: US 12,335,820 B2
(45) Date of Patent: Jun. 17, 2025

(54) METHOD AND APPARATUS FOR DISPLAYING INFORMATION ON A SCREEN

(71) Applicant: MOTOROLA SOLUTIONS, INC., Chicago, IL (US)

(72) Inventors: Pawel Niemiec, Rzeszow (PL); Dawid Przybylski, Cracow (PL)

(73) Assignee: MOTOROLA SOLUTIONS INC., Chicago, IL (US)

( * ) Notice: Subject to any disclaimer, the term of this patent is extended or adjusted under 35 U.S.C. 154(b) by 246 days.

(21) Appl. No.: 17/641,449

(22) PCT Filed: Oct. 18, 2019

(86) PCT No.: PCT/PL2019/050056
§ 371 (c)(1),
(2) Date: Mar. 9, 2022

(87) PCT Pub. No.: WO2021/075986
PCT Pub. Date: Apr. 22, 2021

(65) Prior Publication Data
US 2022/0377509 A1 Nov. 24, 2022

(51) Int. Cl.
*H04W 4/10* (2009.01)
*G06F 3/0482* (2013.01)
*H04W 4/08* (2009.01)

(52) U.S. Cl.
CPC ............ *H04W 4/10* (2013.01); *G06F 3/0482* (2013.01); *H04W 4/08* (2013.01)

(58) Field of Classification Search
CPC .......... H04W 4/10; H04W 4/08; G06F 3/0482
See application file for complete search history.

(56) References Cited

U.S. PATENT DOCUMENTS

| | | | |
|---|---|---|---|
| 5,377,317 A * | 12/1994 | Bates | G09G 5/14 715/792 |
| 7,127,685 B2 | 10/2006 | Canfield et al. | |
| 9,952,838 B2 | 4/2018 | Reichle | |
| 10,313,529 B1 | 6/2019 | Lee et al. | |
| 2007/0250788 A1 | 10/2007 | Rigolet | |
| 2010/0107123 A1 | 4/2010 | Sareen et al. | |
| 2011/0175930 A1 | 7/2011 | Hwang et al. | |
| 2012/0124492 A1 | 5/2012 | Taron | |
| 2012/0242692 A1 * | 9/2012 | Laubach | G06F 3/04883 345/629 |
| 2013/0305184 A1 * | 11/2013 | Kim | G06F 9/451 715/810 |
| 2014/0201681 A1 | 7/2014 | Mahaffey et al. | |
| 2016/0234658 A1 | 12/2016 | Tillet et al. | |
| 2017/0315686 A1 | 11/2017 | Matthews et al. | |
| 2018/0203582 A1 * | 7/2018 | Choi | G06F 3/0481 |

FOREIGN PATENT DOCUMENTS

DK 201670368 A1 1/2017

* cited by examiner

*Primary Examiner* — Junpeng Chen

(57) ABSTRACT

A method and apparatus for displaying and controlling user interface elements is provided herein. During operation, when a user interface element is expanded and covers other user interface elements, the expanded user interface element will have embedded text or user interface elements (e.g., buttons) that show what is covered, and/or allow quick access to various functions for what is covered. Hovering over the text or embedded user interface elements, or clicking on them engages the covered user interface element.

12 Claims, 6 Drawing Sheets

METHOD AND APPARATUS FOR DISPLAYING INFORMATION ON A SCREEN

BACKGROUND OF THE INVENTION

Computer screens (including touch screens) are used in many electronic devices to display control buttons, graphics, text, and to provide a user interface through which a user may interact with the device. A device may display one or more control buttons, soft keys, menus, windows, and other user-user interface elements on a computer screen. A user may interact with the device by contacting the computer screen at locations corresponding to the user-interface (UI) elements with which they wish to interact.

One problem associated with using computer screens is quickly and easily controlling a particular user interface element (e.g., a window) when multiple user interface elements are visible on the computer screen. This is particularly relevant when windows are nested, or lie on top of each other. In this situation, oftentimes it is difficult to control functions of a particular window or to tell what is covered. Therefore, a need exists for a method and apparatus for operating user interface elements on a computer screen that allows a user to better control the user interface elements.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
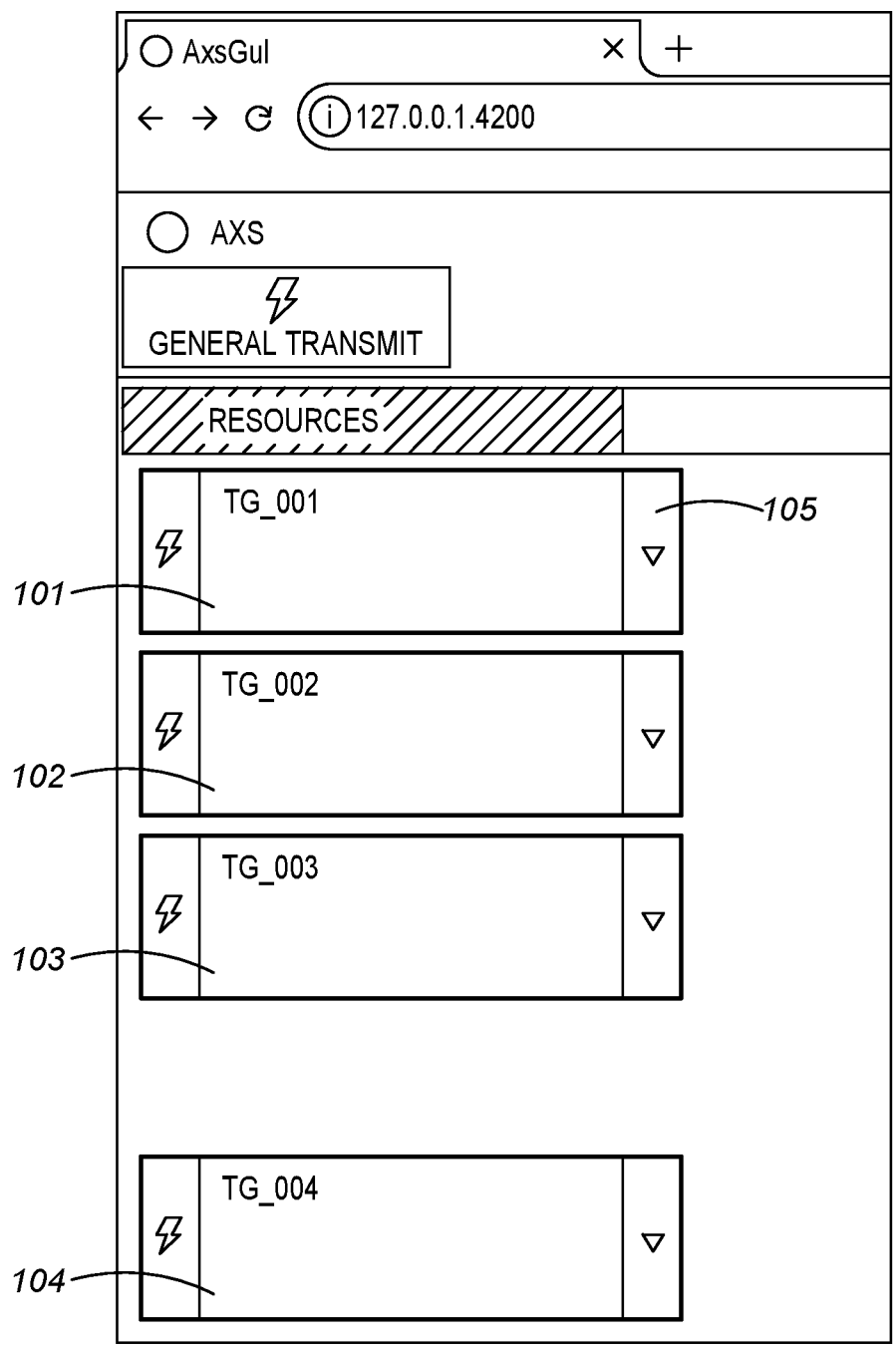
FIG. 1 illustrates displaying information on a computer screen.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for displaying and controlling user interface elements is provided herein. During operation, when a user interface element is expanded or moved and covers other user interface elements, the expanded/moved user interface element will have embedded text or user interface elements (e.g., buttons, windows, . . . , etc.) that show what is covered. The embedded text or user interface elements can allow quick access to those covered user interface elements. Hovering over an embedded text or user interface element, or clicking on the embedded text/user interface element, provides access to the covered user interface element.

Expanding on the above, assume that the above-mentioned user interface elements comprise windows, and expanding a window results in an expanded window that covers at least a portion of other windows. When this happens, the expanded window will have a section that comprises information on the covered windows. Engaging these sections may give access to functions associated with the other windows.

As an example of the above, consider a dispatch center that allows a public-safety officer push-to-talk (PTT) access to various talkgroups, with the talkgroups being displayed within a plurality of windows. PTT devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT section of a window may be engaged to switch a device from a voice reception mode to a transmit-mode. For example, one operator may click on the PTT section of a window on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

As part of a first responder's duties, the first responder may need to communicate with multiple talkgroups over the course of the day. Windows utilized to communicate with these talkgroups may be displayed on computer screen 100 as shown in FIG. 1. More particularly, user-user interface elements 101-104 comprise windows that may be interacted with in order to communicate with various talkgroups. For example, a "click" or "press" on a portion of window 101 will cause transition from a listen state to a transmit state for communication to a first talkgroup (TG_001), while a "click" or "press" on a portion of window 102 will cause transition from a listen state to a transmit state for communication to a second talkgroup (TG_002), . . . , etc. In this particular example, the portion of a window which is clicked or pressed to cause transition from a listen state to a transmit state is shown as a lightning bolt in FIG. 1 and FIG. 2.

Figure 2:
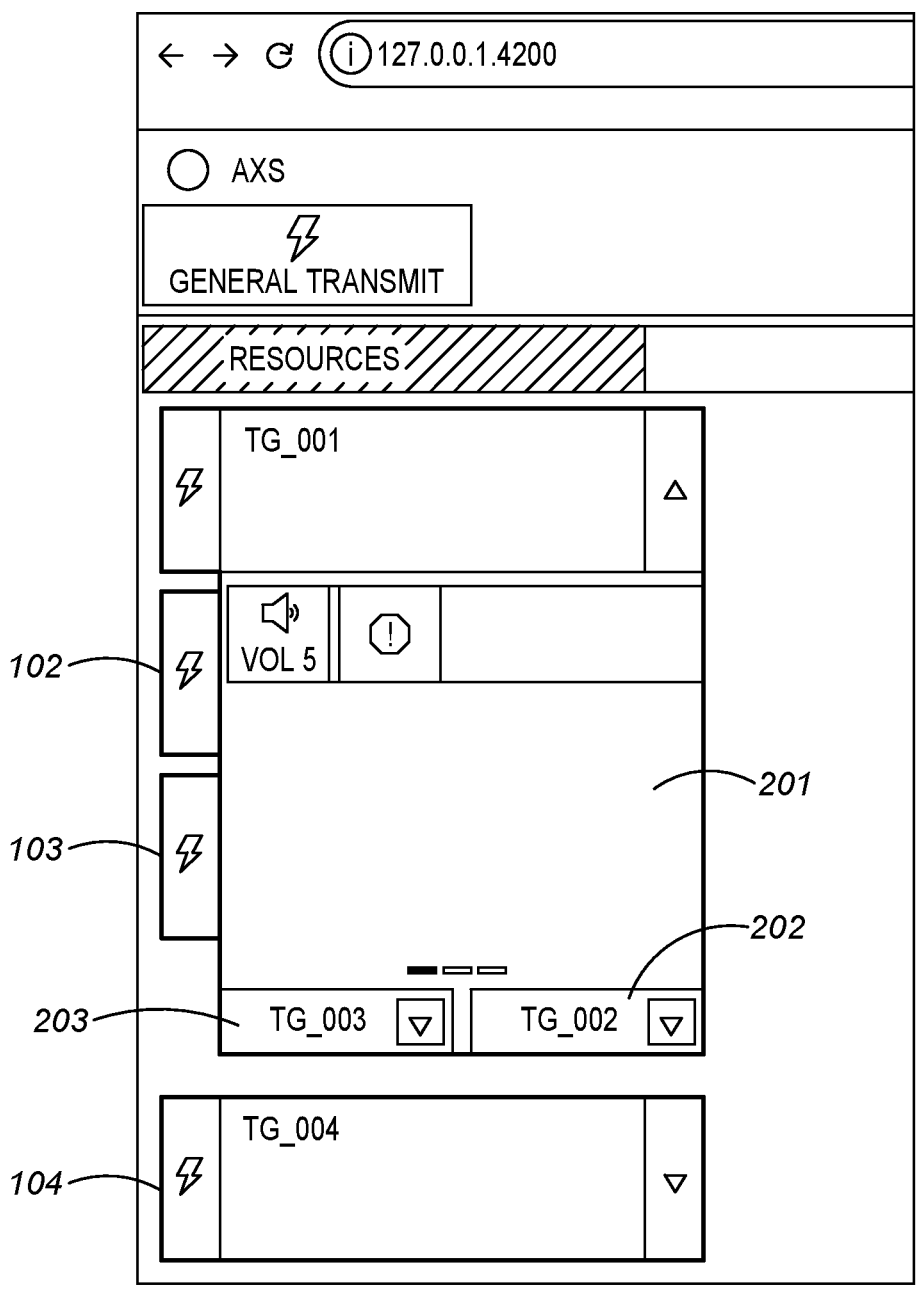
FIG. 2 illustrates a general operational environment, according to one embodiment of the present invention.

Each of the windows 101-104 may be expanded by clicking or pressing a second portion 105 of the associated window (only one expansion section 105 labeled in FIG. 1). This is shown in FIG. 2 where expansion of window 101 results in an expanded window 201 being displayed that covers a larger area of the computer screen than the unexpanded window 101. Within the expanded window 101, additional user interface elements may be displayed (e.g., volume control buttons, emergency call buttons, configuration buttons, . . . , etc.).

As is evident, expanded window 201 is opaque (i.e., not transparent), and the expansion of window 101 results in window 201 that covers at least a portion of windows 102 and 103. Window 201 does not cover window 104. Because of this, window 201 will have user interface elements 202 and 203 and text (e.g., buttons, windows, . . . , etc. 202 and 203) embedded within window 201 that shows what is covered by window 201. In one particular embodiment, engaging (e.g., pressing or clicking) user interface elements 202 and 203 allows transmission over the second and third talkgroup, respectively. In other words, by pressing or clicking on user interface elements 202 and 203, the dispatch operator can easily communicate over talkgroups associated with the covered windows. For example, pressing or clicking on user interface element 203 will cause transmissions to take place over the third talkgroup, while pressing or clicking on user interface element 202 will cause transmissions to take place over the second talkgroup.

Additional functionality may be associated with interface elements 202 and 203. For example, the triangle next to the talkgroup name in interface element 202 allow to a user to expand TG_002 without a need to collapse currently expanded resource TG_001.

It should be noted that since no portion of window 104 is covered by window 201, it will not have an associated user interface element within window 201. In order to transmit over the fourth talkgroup, the user must engage a portion of window 104.

Figure 3:
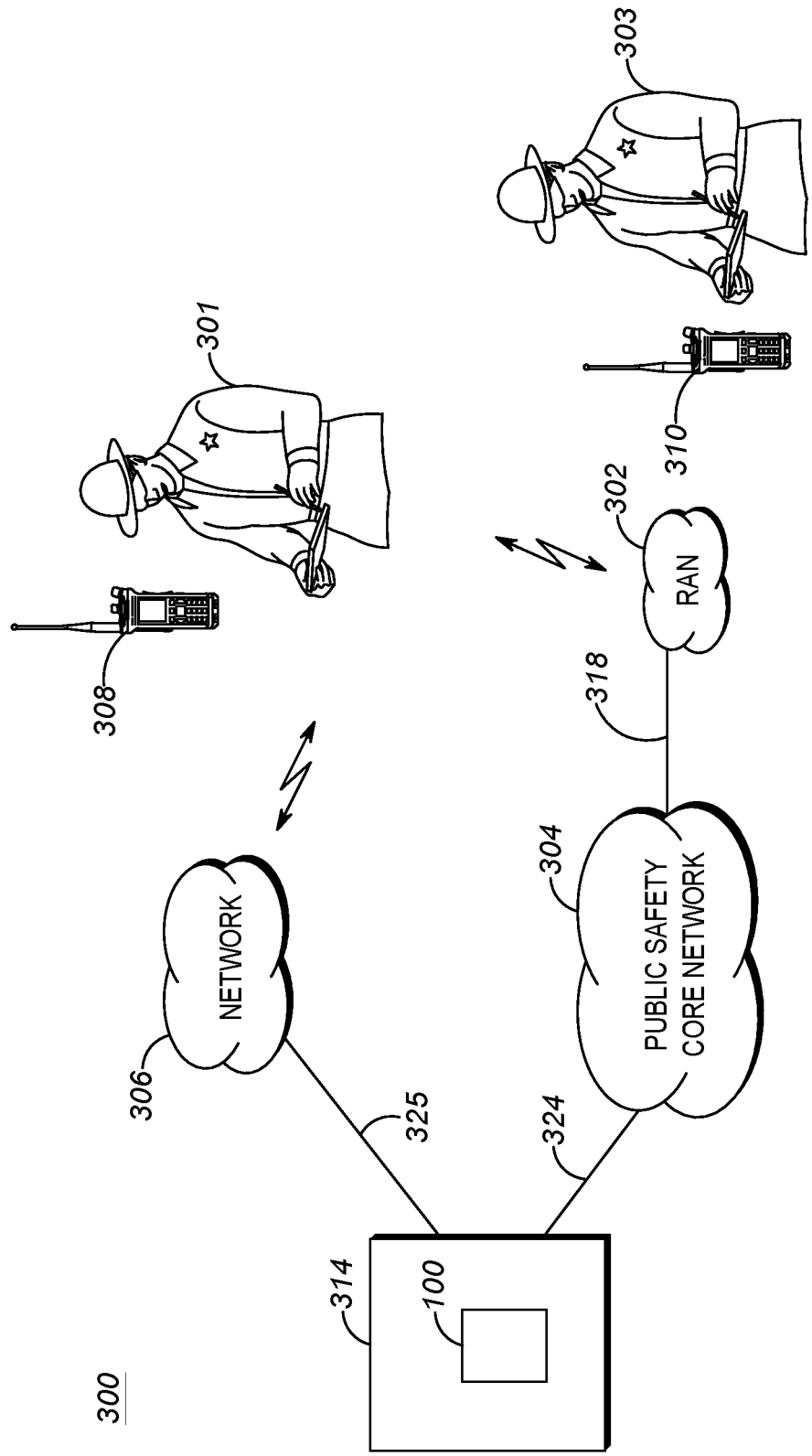
FIG. 3 is a block diagram of a dispatch center.

FIG. 3 illustrates a general operating environment 300 for the present invention. Environment 300 includes one or more radio access networks (RANs) 302 (only one shown in FIG. 2), a public-safety core network 304, devices 308-310, dispatch center 314, and communication links 324, 325, 318. In a preferred embodiment of the present invention, dispatch center 314 serves as a public-safety dispatch center 314 capable of establishing over-the-air communications to various talkgroups as described above.

Communication between dispatch center 314 and devices 308-310 takes place through an intervening network such as, but not limited to a high-speed data network 306 such as a cellular communication system and/or public-safety core network 304 and RAN 302. Thus, as shown in FIG. 3, two separate networks exist, namely public-safety core network 304 for primarily carrying voice traffic from police radios, and a high-speed network 306 (e.g., Verizon, Spring, AT&T, . . . , etc.) for carrying high-speed data. Each of these networks may be utilized for transmitting requests to access software and ACKs/NACKs.

Each RAN 302 includes typical RAN elements such as base stations, base station controllers (BSCs), routers, switches, and the like, arranged, connected, and programmed to provide wireless service to user equipment (e.g., devices 308-310) operated by officers 301-303) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 33 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In a similar manner, network 306 includes elements such as base stations, base station controllers (BSCs), routers, switches, and the like, arranged, connected, and programmed to provide wireless service and data to user equipment (e.g., devices 308-310 operated by officers 301-303 in a manner known to those of skill in the relevant art.

Devices 308-310 may be any suitable computing and/or communication devices operable to engage in wireless communication over an air interface as is known to those in the relevant art. Devices 308-310 comprises any device capable of communication over a talkgroup to each other as well as to dispatch center 314. Mobile devices 308-310 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

It should be noted that while only two officers 301-303 and two devices 308-310 are shown in FIG. 3, one of ordinary skill in the art will recognize that hundreds of officers and devices may actually exist in environment 300.

During operation, dispatch center 314 and devices 308-310 may communicate via PTT communications by engaging a user interface element located on a computer screen configured to displaying UI elements as discussed above. UI elements on a computer screen represent places where the user may interact, the interaction of which causes a processor to execute a particular function, application, or program. UI elements may sometimes be referred to as controls or widgets. These controls or widgets may take any form to execute any function, some of which are described below:

Window—UI elements may take the form of a paper-like rectangle that represents a "window" into a document, form, or design area.

Text box—UI elements may take the form of a box in which to enter text or numbers.

Button—UI elements may take the form of an equivalent to a push-button as found on mechanical or electronic instruments. Interaction with UI elements in this form serve to control functions on device 100. For example, a first UI element may serve to control a volume function for a speaker, while a second UI element may serve to key a microphone for PTT transmissions.

Hyperlink—UI elements may take the form of text with some kind of indicator (usually underlining and/or color) that indicates that clicking it will take one to another screen or page.

Drop-down list or scroll bar—UI elements may take the form of a list of items from which to select. The list normally only displays items when a special button or indicator is clicked.

List box—UI elements may take the form of a user-interface widget that allows the user to select one or more items from a list contained within a static, multiple line text box.

Combo box—UI elements may take the form of a combination of a drop-down list or list box and a single-line textbox, allowing the user to either type a value directly into the control or choose from the list of existing options.

Check box—UI elements may take the form of a box which indicates an "on" or "off" state via a check mark ☑ or a cross ☒. Sometimes can appear in an intermediate state (shaded or with a dash) to indicate mixed status of multiple objects.

Radio button—UI elements may take the form of a radio button, similar to a check-box, except that only one item in a group can be selected. Its name comes from the mechanical push-button group on a car radio receiver. Selecting a new item from the group's buttons also deselects the previously selected button.

Cycle button or control knob—UI elements may take the form of a button or knob that cycles its content through two or more values, thus enabling selection of one from a group of items.

Datagrid—UI elements may take the form of a spreadsheet-like grid that allows numbers or text to be entered in rows and columns.

Switch—UI elements may take the form of a switch such that activation of a particular UI element toggles a device state.

Regardless of the form that a UI element takes, if the UI element is placed over a second UI element (for example by dragging the UI element to a new location, expanding the UI element, . . . , etc.), the UI element will be modified to include information on the second UI element that is now covered by the UI element as described above with respect to FIG. 1 and FIG. 2. Thus, when a user interface element is expanded and covers other user interface elements, the expanded user interface element will have embedded text or user interface elements (e.g., buttons, windows, . . . , etc.) that indicate what is covered, and/or allow quick access to various functions for what is covered. In one embodiment, hovering over the text or embedded user interface elements, or clicking on them engages a function available on the covered user interface element. For example, hovering over the text or embedded user interface element, or clicking on it may cause PTT transmissions to occur over a talkgroup associated with the covered user interface element.

Figure 4:
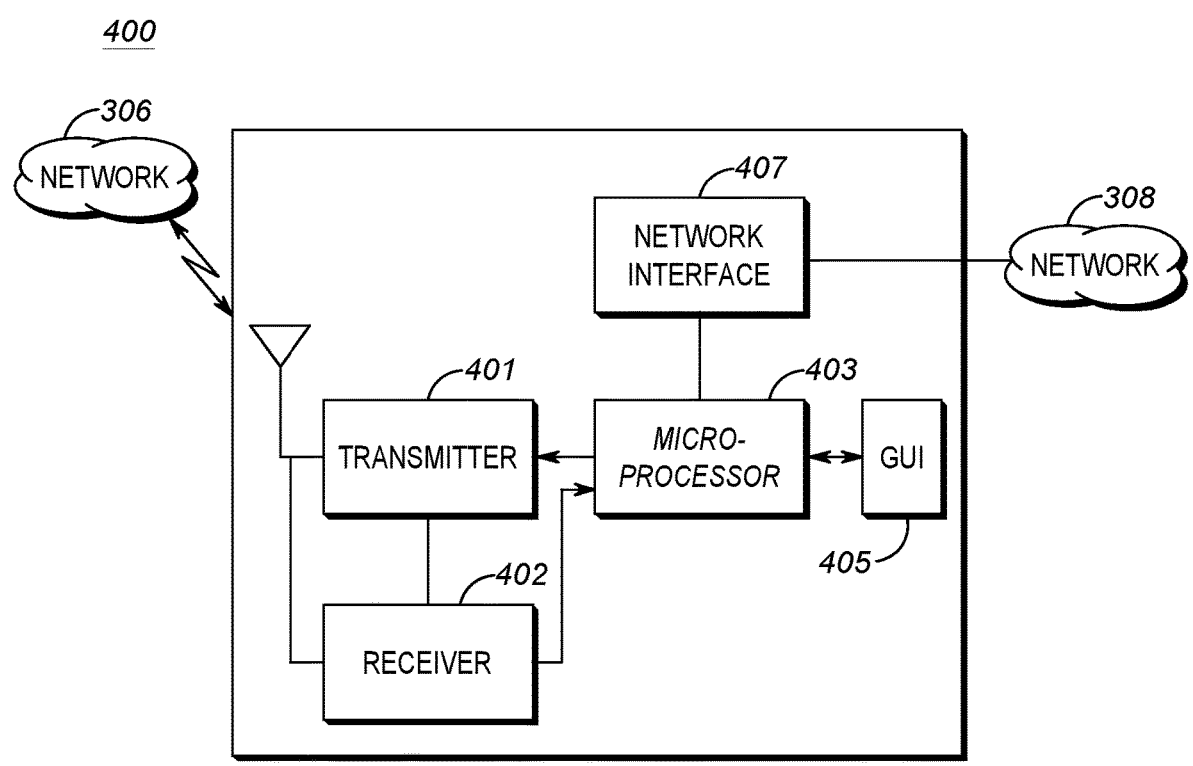
FIG. 4 is a flow chart showing operation of the device of FIG. 3.

FIG. 4 is a block diagram of device 400 capable of displaying user interface elements as described above. Preferably, device 400 is embodied within dispatch center 314, however, in alternate embodiments of the present invention, device 400 may be embodied within devices 308-310 or any other network component shown in FIG. 3.

As shown in FIG. 4, device 400 may include transmitter 401, receiver 402, graphical-user interface (GUI) 405, logic circuitry 403, and network interface 407. In other implementations, device 400 may include more, fewer, or different components. Device 400 may comprise a Smartphone, computer, police radio, dispatch center, or any other device capable of displaying images.

GUI 405 provides a man/machine interface for receiving an input from a user and displaying information. For example, GUI 405 may provide a way of conveying (e.g., displaying) information received from processor 403. Part of this information may comprise modified UI elements based on covered UI elements. In order to provide the above features (and additional features), GUI 405 may comprise any combination of a touch screen, a computer screen 100, a keyboard, or any other interface needed to receive a user input and provide information to the user. GUI 405 is configured to receive an input from a user to engage a UI element. The input may comprise a command to move a UI element, expand a UI element, . . . , etc. For example, GUI 405 may receive a command from a user to expand windows 101-104 as shown in FIG. 1 and FIG. 2, or to establish a PTT call by engaging windows 101-104.

Logic circuitry 403 comprises a digital signal processor (DSP), general purpose microprocessor, a programmable logic device, or application specific integrated circuit (ASIC) and is utilized to display UI elements as described above.

Device 400 establishes PTT communications by utilizing transmitter 401, receiver 402, and/or network interface 407. In an illustrative embodiment, network 306 is attached (i.e., connected) to device 400 through network interface 407 and communicates with processor 403. Network interface 407 includes elements including processing, modulating, and transceiver elements that are operable in accordance with any one or more standard or proprietary wired interfaces, wherein some of the functionality of the processing, modulating, and transceiver elements may be performed by means of processor 403.

In the illustrative embodiment, wireless network 304 is attached (i.e., connected) to device 400 through transmitter 401 and receiver 402 both of which communicate with processor 403. Network 304 is connected to device 400 via a wireless connection, although this connection may be wired in alternate embodiments.

Transmitter 401 and receiver 402 are preferably wireless, and may be long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously.

The apparatus shown in FIG. 4 comprises graphical user interface (GUI) 405 configured to display user interface elements and at least logic circuitry 403 coupled to GUI 405. The logic circuitry is configured to cause a first window, a second window, a third window and a fourth window to be displayed on the GUI, wherein the first window identifies a first talkgroup, the second window identifies a second talkgroup, the third window identifies a third talkgroup, and the fourth window identifies a fourth talkgroup. Logic circuitry 403 is also configured to receive instructions to expand the first window and cause the first window to be expanded on the GUI over the second window and the third window, such that the first window covers at least a portion of the second window and at least a portion of the third window. Logic circuitry 403 is configured to determine that the portion of the second window and the third window are covered by the first window and cause GUI 405 to place text within the expanded first window that identifies the second talkgroup and the third talkgroup such that the expanded first window comprises the text identifying the second talkgroup and the text identifying the third talkgroup but does not comprise text identifying the fourth talkgroup.

As discussed above, the first window, the second window, and the third window, and the fourth window comprise first, second, third, and fourth push-to-talk (PTT) user interface elements, respectively, wherein engaging the first PTT user interface element results in a transmission on the first talkgroup, engaging the second PTT user interface element results in a transmission on the second talkgroup, engaging the third PTT user interface element results transmission on the third talkgroup, and engaging the fourth PTT user interface element results in transmission on the fourth talkgroup.

Additionally, in one embodiment of the present invention, engaging the text within the expanded first window that identifies the second talkgroup results in transmission on the second talkgroup, and engaging the text within the expanded first window that identifies the third talkgroup results in transmission on the third talkgroup.

Figure 5:
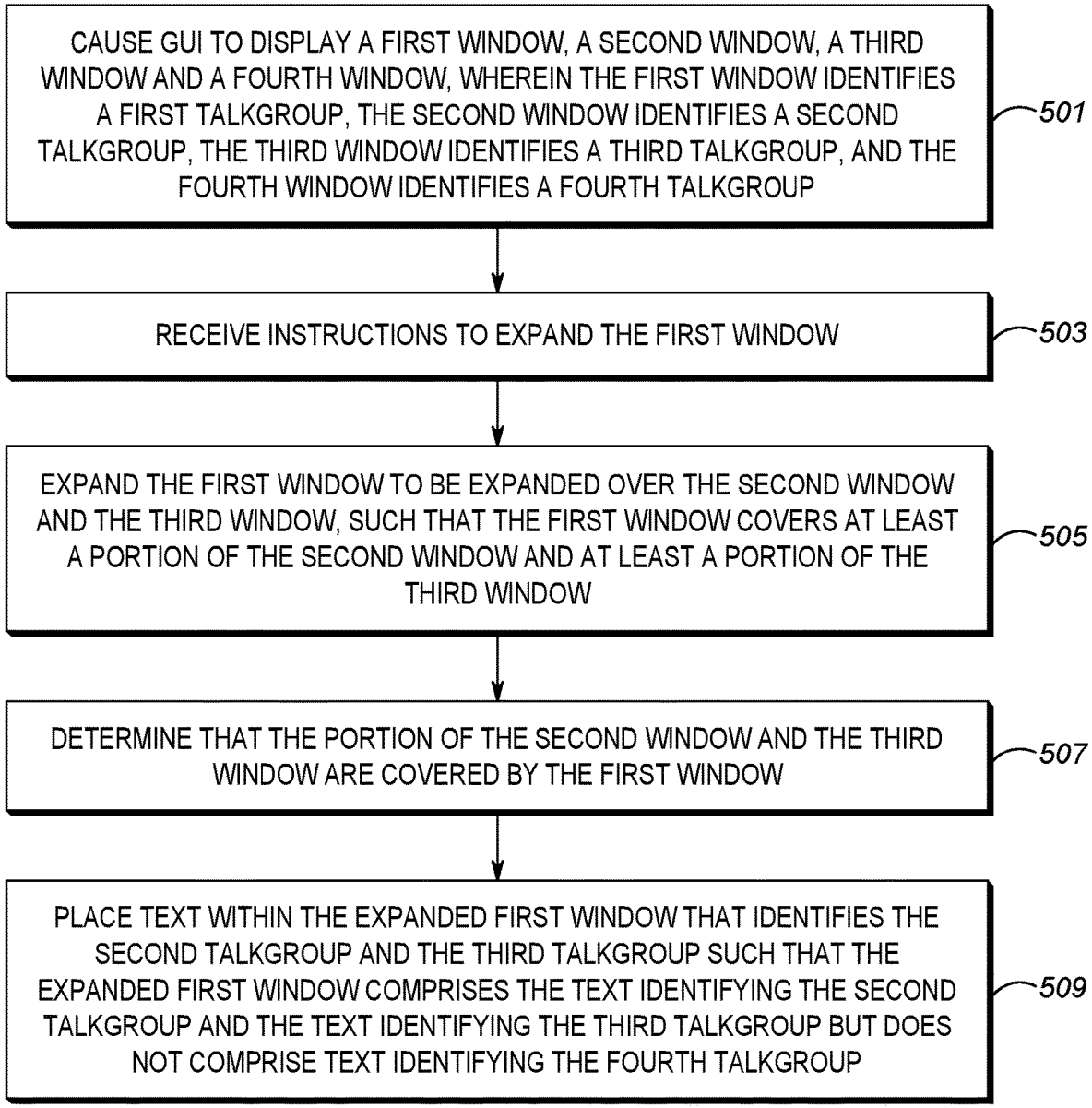
FIG. 5 is a flow chart showing operation of the device of FIG. 4.

FIG. 5 is a flow chart showing operation of the device shown in FIG. 4. The logic flow begins at step 501 where logic circuitry 403 causes GUI 405 to display a first window, a second window, a third window and a fourth window, wherein the first window identifies a first talkgroup, the second window identifies a second talkgroup, the third window identifies a third talkgroup, and the fourth window identifies a fourth talkgroup.

At step 503 GUI 405 receives instructions to expand the first window. These instructions may comprise receiving a mouse click over a section of a computer screen that indicates a desire to expand a window. GUI 405 sends a notification of the desire to expand the first window to logic circuitry 403 which causes the first window to be expanded over the second window and the third window, such that the first window covers at least a portion of the second window and at least a portion of the third window (step 505).

At step 507, logic circuitry 403 determines that the portion of the second window and the third window are covered by the first window and sends instructions (step 509) to GUI 405 to place text within the expanded first window that identifies the second talkgroup and the third talkgroup such that the expanded first window comprises the text identifying the second talkgroup and the text identifying the third talkgroup but does not comprise text identifying the fourth talkgroup.

As discussed above, the first window, the second window, and the third window, and the fourth window comprise first, second, third, and fourth push-to-talk (PTT) user interface elements, respectively, wherein engaging the first PTT user interface element results in a transmission on the first talkgroup, engaging the second PTT user interface element results in a transmission on the second talkgroup, engaging the third PTT user interface element results transmission on the third talkgroup, and engaging the fourth PTT user interface element results in transmission on the fourth talkgroup.

Additionally, in one embodiment of the present invention, engaging the text within the expanded first window that identifies the second talkgroup results in transmission on the second talkgroup, and engaging the text within the expanded first window that identifies the third talkgroup results in transmission on the third talkgroup.

Figure 6:
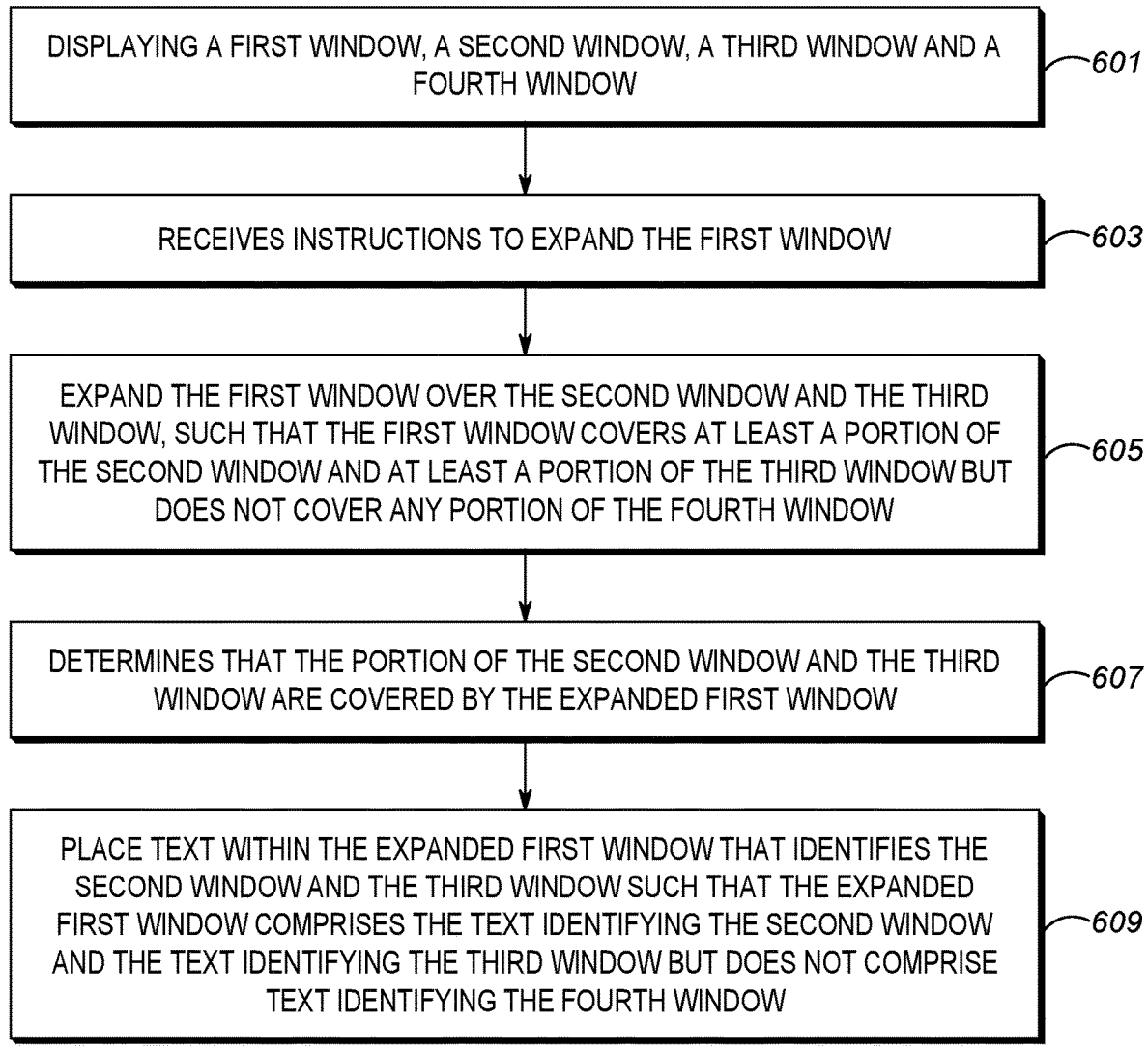
FIG. 6 is a flow chart showing operation of the device of FIG. 4.

FIG. 6 is a flow chart showing operation of the device of FIG. 4. The logic flow begins at step 601 where GUI 405 is displaying a first window, a second window, a third window and a fourth window. At step 603, GUI 405 receives instructions to expand the first window and passes the instructions to logic circuitry 403. At step 605, logic circuitry 403 causes GUI 405 to expand the first window over the second window and the third window, such that the first window covers at least a portion of the second window and at least a portion of the third window but does not cover any portion of the fourth window.

At step 607, logic circuitry determines that the portion of the second window and the third window are covered by the expanded first window, and causes GUI 405 to place text within the expanded first window that identifies the second window and the third window such that the expanded first window comprises the text identifying the second window and the text identifying the third window but does not comprise text identifying the fourth window (step 609).

As discussed above, the first window, the second window, the third window, and the fourth window comprise first, second, third, and fourth user interface elements, respectively, wherein engaging the first user interface element results in a first action being executed, engaging the second user interface element results in a second action being executed, engaging the third user interface element results in a third action being executed, and engaging the fourth user interface element results in a fourth action being executed.

Additionally, in one particular embodiment, the text identifying the second window comprises a fourth user interface element, and the text identifying the third window comprises a fifth user interface element, wherein engaging the fourth user interface element results in the second action being executed, and engaging the fifth user interface element results in the third action being executed.

It should be noted that the above description was provided with GUI 405 comprising elements such as a mouse, keyboard, monitor, touchscreen, computer screen . . . , etc. Thus, when GUI receives instructions to perform a task, one of ordinary skill in the art will recognize that a mouse, keyboard, touchscreen, or any other element of GUI 405 may receive the task. Additionally, the desire to perform the task is passed to logic circuitry 403. Logic circuitry 403 is configured to output display information to GUI 405, which configures a touchscreen, monitor, computer monitor, . . . , etc. accordingly.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:

displaying a first window, a second window, a third window and a fourth window, wherein the first window identifies a first talkgroup, the second window identifies a second talkgroup, the third window identifies a third talkgroup, and the fourth window identifies a fourth talkgroup;

receiving instructions to expand the first window;

expanding the first window over the second window and the third window, such that the first window covers at least a portion of the second window and at least a portion of the third window;

determining that the portion of the second window and the third window are covered by the first window;

placing text within the expanded first window that identifies the second talkgroup and the third talkgroup such that the expanded first window comprises the text identifying the second talkgroup and the text identifying the third talkgroup but does not comprise text identifying the fourth talkgroup; and allowing transmission over the second talkgroup or the third talkgroup, based on engaging the text identifying the second talkgroup or the text identifying the third talkgroup, while the second window and the third window are covered by the first window.

2. The method of claim 1 wherein the first window, the second window, and the third window, and the fourth window comprise first, second, third, and fourth push-to-talk (PTT) user interface elements, respectively, wherein engaging the first PTT user interface element results in a transmission on the first talkgroup, engaging the second PTT user interface element results in a transmission on the second talkgroup, engaging the third PTT user interface element results transmission on the third talkgroup, and engaging the fourth PTT user interface element results in transmission on the fourth talkgroup.

3. The method of claim 2 wherein engaging the text within the expanded first window that identifies the second talkgroup results in transmission on the second talkgroup, and engaging the text within the expanded first window that identifies the third talkgroup results in transmission on the third talk group.

4. The method of claim 3 wherein the expanded first window is opaque.

5. A method comprising the steps of:
displaying a first window, a second window, a third window and a fourth window;
receiving instructions to expand the first window;
expanding the first window over the second window and the third window, such that the first window covers at least a portion of the second window and at least a portion of the third window but does not cover any portion of the fourth window;
determining that the portion of the second window and the third window are covered by the expanded first window;
placing text within the expanded first window that identifies the second window and the third window such that the expanded first window comprises the text identifying the second window and the text identifying the third window but does not comprise text identifying the fourth window; and
allowing transmission over the second talkgroup or the third talkgroup, based on engaging the text identifying the second talkgroup or the text identifying the third talkgroup, while the second window and the third window are covered by the first window.

6. The method of claim 5 wherein the first window, the second window, the third window, and the fourth window comprise first, second, third, and fourth user interface elements, respectively, wherein engaging the first user interface element results in a first action being executed, engaging the second user interface element results in a second action being executed, engaging the third user interface element results in a third action being executed, and engaging the fourth user interface element results in a fourth action being executed.

7. The method of claim 6 wherein the text identifying the second window comprises a fourth user interface element, and the text identifying the third window comprises a fifth user interface element, wherein engaging the fourth user interface element results in the second action being executed, and engaging the fifth user interface element results in the third action being executed.

8. The method of claim 7 wherein the expanded first window is opaque.

9. An apparatus comprising:
a graphical user interface (GUI) configured to display user interface elements;
logic circuitry coupled to the GUI, the logic circuitry configured to:
cause a first window, a second window, a third window and a fourth window to be displayed on the GUI, wherein the first window identifies a first talkgroup, the second window identifies a second talkgroup, the third window identifies a third talkgroup, and the fourth window identifies a fourth talkgroup;
receive instructions to expand the first window;
cause the first window to be expanded on the GUI over the second window and the third window, such that the first window covers at least a portion of the second window and at least a portion of the third window;
determine that the portion of the second window and the third window are covered by the first window;
cause the GUI to place text within the expanded first window that identifies the second talkgroup and the third talkgroup such that the expanded first window comprises the text identifying the second talkgroup and the text identifying the third talkgroup but does not comprise text identifying the fourth talkgroup; and
allowing transmission over the second talkgroup or the third talkgroup, based on engaging the text identifying the second talkgroup or the text identifying the third talkgroup, while the second window and the third window are covered by the first window.

10. The apparatus of claim 9 wherein the first window, the second window, and the third window, and the fourth window comprise first, second, third, and fourth push-to-talk (PTT) user interface elements, respectively, wherein engaging the first PTT user interface element results in a transmission on the first talkgroup, engaging the second PTT user interface element results in a transmission on the second talkgroup, engaging the third PTT user interface element results transmission on the third talkgroup, and engaging the fourth PTT user interface element results in transmission on the fourth talkgroup.

11. The apparatus of claim 10 wherein engaging the text within the expanded first window that identifies the second talkgroup results in transmission on the second talkgroup, and engaging the text within the expanded first window that identifies the third talkgroup results in transmission on the third talkgroup.

12. The apparatus of claim 11 wherein the expanded first window is opaque.

* * * * *